United States Patent [19]

Yamamoto et al.

[11] Patent Number: 5,016,721

[45] Date of Patent: * May 21, 1991

[54] FULL-TURN TYPE WORKING MACHINE

[75] Inventors: Nobuyoshi Yamamoto, Tsuchiura; Yasuhiko Murata, Ushiku; Fumimasa Saeki, Tsuchiura; Hirosige Kurosaka, Ibaraki, all of Japan

[73] Assignee: Hitachi Construction Machinery Co., Ltd., Tokyo, Japan

[*] Notice: The portion of the term of this patent subsequent to Mar. 13, 2007 has been disclaimed.

[21] Appl. No.: 427,568

[22] Filed: Oct. 27, 1989

Related U.S. Application Data

[63] Continuation of Ser. No. 254,862, Oct. 7, 1988, Pat. No. 4,907,667.

[51] Int. Cl.⁵ ............................................. B02F 3/32
[52] U.S. Cl. .................................. 180/89.13; 49/381; 49/394; 414/695.5
[58] Field of Search ............. 180/89.13, 89.11, 89.17, 180/89.12; 296/146, 151, 155; 414/687, 695.5; 49/394, 381; 312/305, 138.1

[56] References Cited

U.S. PATENT DOCUMENTS

| 1,619,883 | 3/1927 | Pukt et al. | 312/305 X |
| 2,055,288 | 9/1936 | Guthrie | 312/305 |
| 4,133,142 | 1/1979 | Dzus, Jr. | 49/394 X |
| 4,208,837 | 6/1980 | Black, Sr. et al. | 49/394 X |
| 4,571,147 | 2/1986 | Schaeff | 414/687 X |

FOREIGN PATENT DOCUMENTS

| 62-16150 | 1/1987 | Japan . |
| 63-36567 | 3/1988 | Japan . |
| 63-36568 | 3/1988 | Japan . |
| 63-100550 | 6/1988 | Japan . |

*Primary Examiner*—Andres Kashnikow
*Assistant Examiner*—Michael Mar
*Attorney, Agent, or Firm*—Oblon, Spivak, McClelland, Maier & Neustadt

[57] ABSTRACT

Described is a full-turn type working machine which generally consists of a lower travelling body and an upper rotary body. The upper rotary body includes a machine room, an operator's cabin, a fuel tank and a counterweight which are laid out within a circle of a predetermined rotational radius R. In addition, a door which is fitted in a side panel of the operator's cabin can be opened largely rearward through an angle greater than 180 degrees and received within the circle of the predetermined rotational angle in an opened state.

8 Claims, 8 Drawing Sheets

FULL-TURN TYPE WORKING MACHINE

This is a continuation, of application Ser. No. 07/254,862, filed on Oct. 7, 1988 now U.S. Pat. No. 4,907,667.

BACKGROUND OF THE INVENTION

(1) Field of the Invention

This invention relates to a full-turn type working machine such as a hydraulic excavator and the like, and more particularly to a full-turn type working machine which can turn the upper rotary body even in a narrow working site to carry out excavation or other jobs.

(2) Description of the Prior Art

In Japanese Laid-Open Utility Model Specification Nos. 62-16150, 63-36567, 63-36568 and 63-100550, Applicant proposed full-turn type working machines which can turn the upper rotary body even in a narrow working site for excavation or other jobs.

Illustrated in FIGS. 1 and 2 is a small-size hydraulic excavator as an example of the prior art full-turn type working machine of this type.

In these figures, indicated at 1 is a lower travelling body, and at 2 is an upper rotary body which is swivellably mounted on the lower travelling body 1. The upper rotary body 2 is provided with a frame 2A which constitutes a skeletal structure together with a bracket 10 which will be described hereinafter. A machine room 3 is provided on the frame 2A on the right side of the bracket 10. As shown in FIG. 2, engine 4, radiator 5 and hydraulic pump 6 are provided in the machine room 3. The hydraulic pump 6 is driven from the engine 4 to supply operating oil in an oil tank 7 in a rear portion to a motor for driving the lower travelling body 1 and a motor for turning the upper rotary body 2 (both of the motors are not shown) and to cylinders 17A, 18A and 19A which will be described hereinafter. In FIG. 2, the top cover of the machine room 3 and working equipments 16, which will be described hereinafter, are removed for the convenience of illustration.

Denoted at 8 is an operator's cabin which is provided on the frame 2A in a front left portion of the upper rotary body 2, and which is equipped with an operator's seat 8A. A plural number of operating levers (not shown) are provided on the front side of the operator's seat 8A to switch the position of a control valve 11 which will be described hereinafter. The reference numeral 9 denotes a door which is provided on the left side of the operator's cabin 8 to open and close the opening through which the operator gets into and out of the operator's cabin 8. The door 9 is swingably attached to a rear left side portion of the operator's cabin 8 by means of hinges (not shown), and swung open rearward as shown in the drawing.

Indicated at 10 are a pair of brackets which are provided in the front center portion of the frame 2A between the machine room 3 and the operator's cabin 8 to form part of the main structure of the frame 2A. Pivotally mounted on these brackets 10 are a boom 17 and cylinder 17A of the working equipments 16. The reference numeral 11 denotes a control valve which is mounted on the frame 2A rearward of the brackets 10. This control valve 11 is switchable by way of the operating levers in the operator's cabin 8 to control the supply of the operating oil from the hydraulic pump 6 to the travelling and rotating motors and the respective cylinders 17A, 18A and 19A. Designated at 12 is a fuel tank which is mounted on the frame 2A side by side with the oil tank 7 and in a position rearward of the operator's cabin 8 and on the front side of a counterweight 13 which will be described hereinafter.

Denoted at 13 is the just-mentioned counterweight which is located in a rear center portion of the upper rotary body 2, and at 14 is a reinforcing member which is provided integrally on the rear side of the counterweight 13 and which is formed by arcuately bending a thick plate material of iron or the like along a circle 15 of a predetermined rotational radius R which will be explained hereinafter, the reinforcing member 14 covering the rear side of the machine room 3 to protect same against obstacles in the circumference. In this case, the corner portions A, B, C and D of the reinforcing member 14, machine room 3, operator's cabin 8 and the like are located to inscribe the circle 15 of the rotational radius R as shown in FIG. 2 to prevent the corner portions from hitting against obstacles on the outer side of the circle 15.

Further, the reference numeral 16 indicates the working equipments which are vertically swingable and which includes a boom 17 pivotally connected to the brackets 10 by pins and turned up and down by the boom cylinder 17A, an arm 18 pivotally connected to the fore end of the boom 17 by pin and swung by the arm cylinder 18A, and a bucket 19 pivotally connected to the fore end of the arm 18 by pin and swung by the bucket cylinder 19A to perform a ground excavating job or the like.

With the prior art hydraulic excavator of the above-described arrangement, earth excavation is carried out by turning the bucket 19 by the bucket cylinder 19A while swinging the boom 17 and arm 18 up and down by the boom cylinder 17A and the arm cylinder 18A, respectively. In a narrow working site, the boom 17 is turned upward (uplifted) and the arm 18 and bucket 19 are turned into folded state as shown in FIG. 1, and then the upper rotary body 2 is turned along the circle 15 with the rotational radius R shown in FIG. 2 thereby permitting to turn the boom 17 and arm 18 into a desired direction to excavate the ground with the bucket 19.

In case of the above-described prior art, when the door 9 of the operator's cabin 8 is opened as shown in FIG. 2, the outer free end of the door 9 is protruded on the outer side of the circle 15 of the rotational radius R. This is problematic especially in the summer season or on hot days when the operator often continues the excavation with the door 9 open to get wind into the cabin 8.

Namely, the prior art has a problem that, when the upper rotary body 2 is turned with the door 9 open, there are possibilities of the door 9 colliding against circumferential structures, resulting in damages of the door 9 or injury of the operator.

SUMMARY OF THE INVENTION

It is an object of the present invention to solve the above-described problems of the prior art, more specifically, to provide a full-turn type working machine which precludes the possibility of the operator's cabin door colliding against circumferential obstacles even when the upper rotary body is turned with the door open, preventing damages of the door and injury of the operator which might otherwise result from the collision.

It is another object of the invention to provide a full-turn type working machine which can turn the upper rotary body safely with the door open simply by confirming that the left front corner of the operator's cabin is not interfered by circumferential structures or obstacles, thereby lessening the burden of the operator during operation with respect to surrounding objects.

It is a further object of the invention to provide a full-turn type working machine which permits to keep the operator's cabin door in an open state during operation and which is provided with means for locking the door in the open state.

In accordance with the present invention, for achieving the above-mentioned objects, there is provided a full-turn type working machine which essentially comprises: a lower travelling body; and an upper rotary body having machine room, operator's cabin, fuel tank and counterweight located within a circle of a predetermined rotational radius R; the operator's cabin containing a door being rearwardly openable toward the counterweight through an angle greater than 180 degrees and being accommodated within the boundaries of the circle of the rotational radius R.

The above and other objects, features and advantages of the invention will become apparent from the following description, taken in conjunction with the accompanying drawings.

BRIEF DESCRIPTION OF THE DRAWINGS

In the accompanying drawings:

FIGS. 1 and 2 illustrate an example of the prior art, of which:

FIG. 1 is a front view of a hydraulic excavator with a door in open state; and

FIG. 2 is a plane view of an upper rotary body with a top cover thereof removed for the sake of illustration.

FIGS. 3 through 6 illustrate a first embodiment of the invention, of which:

FIG. 3 is a front view of the hydraulic excavator, showing its general construction;

FIG. 4 is a plane view of the upper rotary body with the top cover of the machine room removed;

FIG. 5 is a front view of the hydraulic excavator with the door in open state; and FIG. 6 is a plane view similar to FIG. 4 but showing the door in open state.

FIGS. 7 through 14 illustrate a second embodiment of the invention, of which:

FIG. 7 is a front view of the hydraulic excavator;

FIG. 8 is a plane view of the excavator of FIG. 7;

FIG. 9 is a left-hand side view of the machine of FIG. 7 with the working equipments removed;

FIG. 10 is an enlarged sectional view taken on line X—X of FIG. 7;

FIG. 11 is a sectional view similar to FIG. 10 but showing the door in open state;

FIG. 12 is an enlarged sectional view of the operator's cabin door provided with a lock device;

FIG. 13 is a vertical section of the lock before locking the door; and

FIG. 14 is a vertical section of the lock holding the door in locked state.

DESCRIPTION OF PREFERRED EMBODIMENTS

Figure 1:
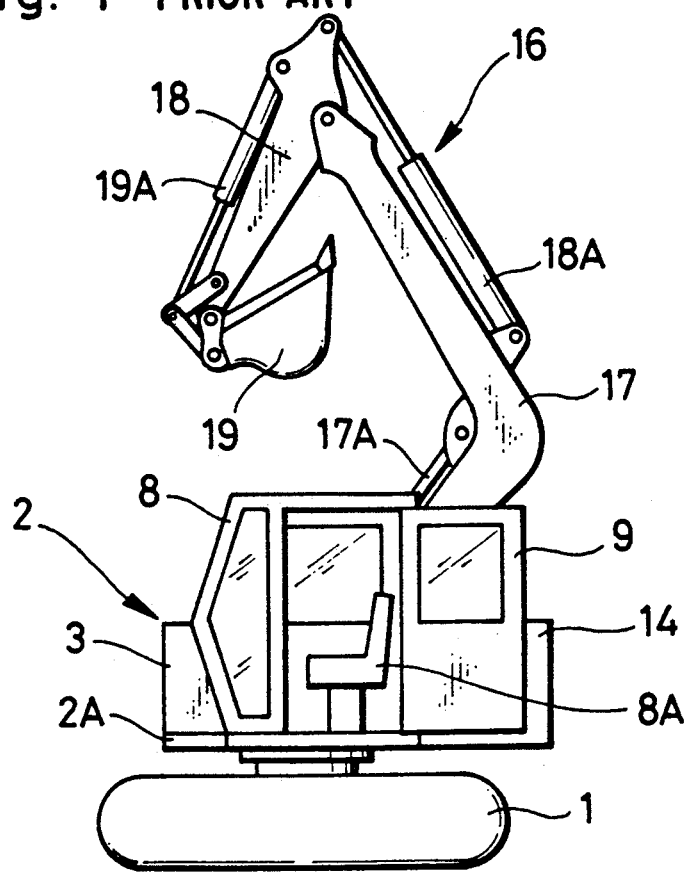
Figure 2:
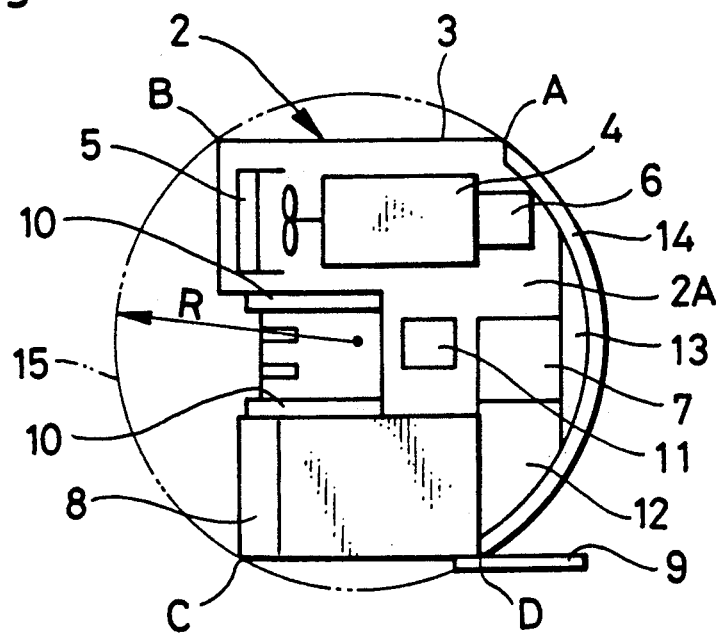
Figure 3:
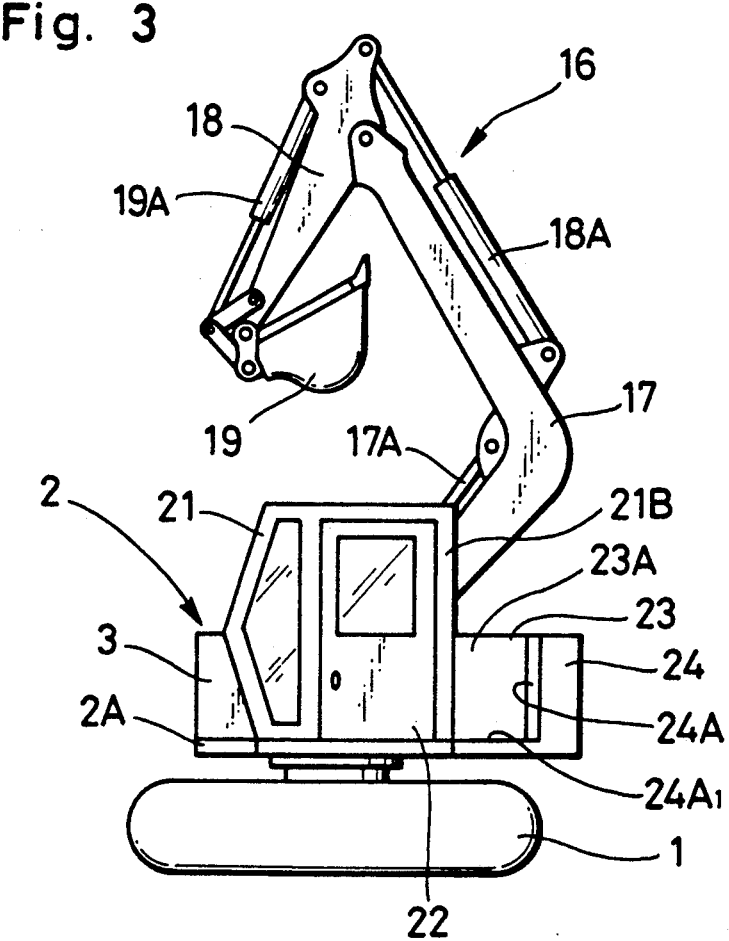
Figure 4:
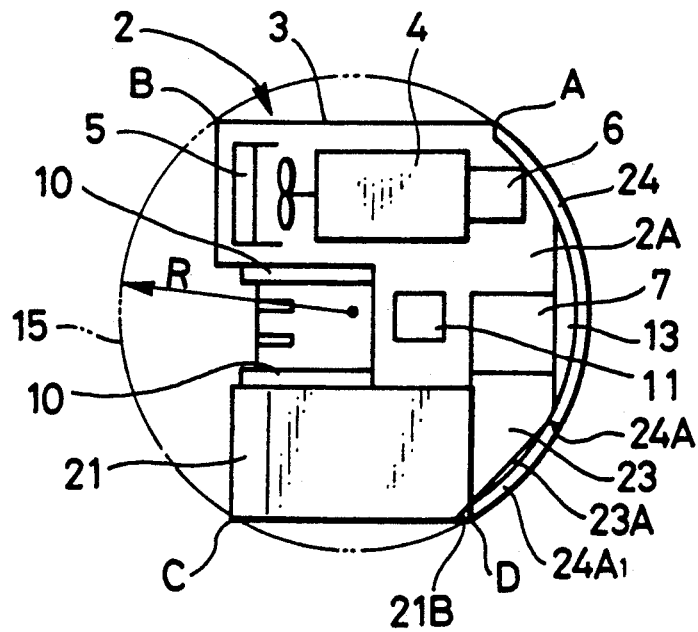

Hereafter, the invention is described more particularly by way of the preferred embodiments shown in FIGS. 3 through 14. In the following description and drawings, the component parts common to the prior art working machine shown in FIGS. 1 and 2 are designated by common reference numerals, and their explanations are omitted to avoid repetitions.

Figure 5:
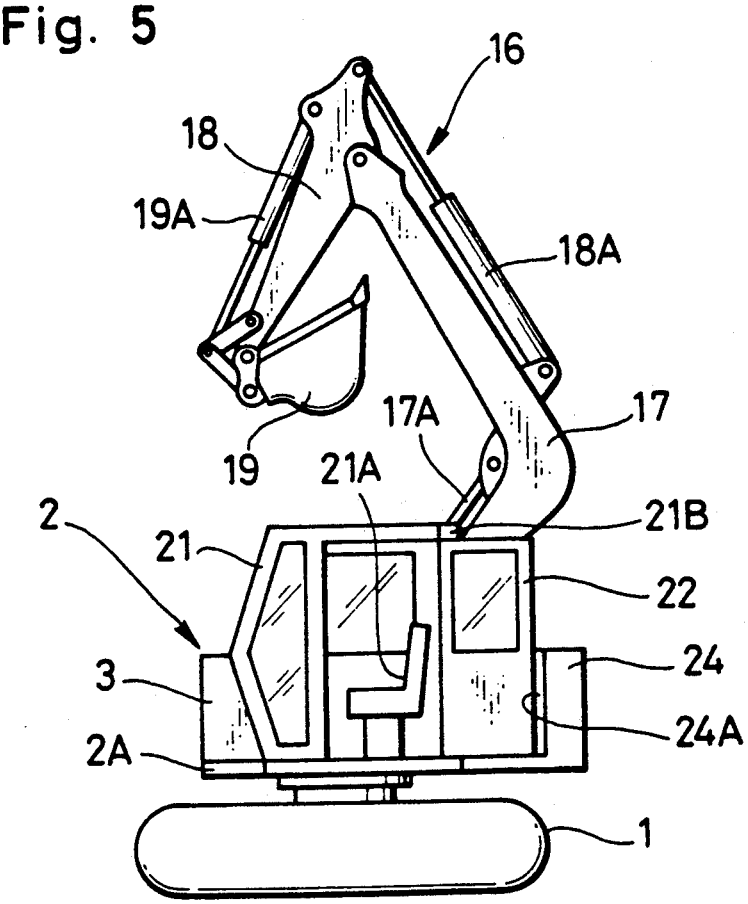
Figure 6:
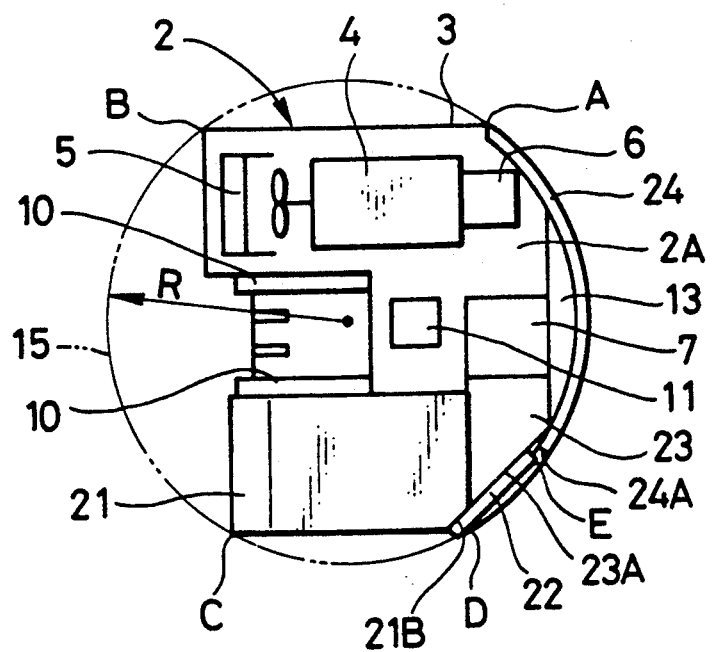

Referring to FIGS. 3 to 6, there is shown the first embodiment of the invention, in which indicated at 21 is an operator's cabin which is provided on the frame 2A in a front left portion of the upper rotary body 2. The operator's cabin 21 is formed similarly to the prior art counterpart 8 and, as shown in FIG. 5, interiorly provided with an operator's seat 21A and operating levers (not shown). In a left rear portion which corresponds to the corner portion D, the operator's cabin 21 is provided with a chamfered portion 21B which is coextensive with the entire height of the operator's cabin 21. As shown in FIGS. 5 and 6, the provision of this chamfered portion 21B permits to open largely rearward a door 22 which will be described hereinafter.

The door 22 which openably closes the opening on the left side of the operators' cabin 21 is formed similarly to the above-described conventional door 9 except that it is arranged to be opened rearward toward the counterweight 13 through a rotational angle greater than 180 degrees, for example, through an angle of about 220 degrees (FIG. 6). When fully opened, the door 22 is abutted against the left side of a fuel tank 23 which will be described hereinafter, and retained in the position of FIG. 6 by means of a lock device or the like (not shown). In this state, the corner portion E of the outer free end of the door 22 is located in a position inscribing or on the inner side of the circle 15 of the rotational radius R. Namely, the door 22 is received within the boundaries of the circle 15.

Designated at 23 is a fuel tank employed in this embodiment, the fuel tank 23 being located on the rear side of the operator's cabin 21 and on the front side of the counterweight 13 similarly to the fuel tank 12 on the conventional machine. This fuel tank 23, however, has its left side wall inclined to form a chamfered portion 23A of an angle conforming with the chamfered portion 21B of the operator's cabin 21, thereby permitting to open the door 22 largely in the rearward direction. Indicated at 24 is a reinforcing member which is provided integrally with the back side of the counterweight 13. This reinforcing member 24 is formed in an arcuate shape similarly to the prior art reinforcing member 14, but it is formed with a substantially L-shaped notch 24A with a bottom portion $24A_1$ in its left side wall portion located rearward of the operator's cabin 21, to receive therein the door 22 which is in fully opened state.

In operation, the hydraulic excavator of this embodiment, with the above-described construction, is basically same as and involves no particular differences from the prior art machine.

However, due to the provision of the chamfered portion 21B in the left rear portion of the operator's cabin 21, the notch 24A provided in the reinforcing member 24 and the inclined chamfered portion 23A provided on the left side wall of the fuel tank 23 conforming with the chamfered portion 21B, the door 22 can be opened largely rearward and, when in fully opened state, safely received within the circle 15 of the rotational radius R. Accordingly, there is no possibility of the door 22 protruding on the outer side of the circle 15 when fully opened as experienced in the case of the prior art machine. It follows that the operator can turn the upper rotary body 2 and securely avoid collision of the door 22 with a circumferential obstacle simply by checking if the fore corner portion C would contact any circumferential structure or obstacle.

Therefore, even if the upper rotary body 2 is turned with the door in fully opened state, this embodiment can suitably prevent damages of the door 22 or injury of the operator or similar accidents as caused by collision with a circumferential structure or obstacle, while lessening the operator's efforts in paying attention to circumferential obstacles. Besides, it becomes possible for the operator to carry out excavation with the door 22 in open state in the summer season or on hot days to secure an airy working environment.

Referring to FIGS. 7 through 14, there is illustrated a second embodiment of the invention, which has features in that the operator's cabin is enlarged as much as possible to improve the dwellability of the operator and the operational stability and that the door is lockable to a chamfered portion which is provided in a left rear portion of the operator's cabin.

Figure 9:
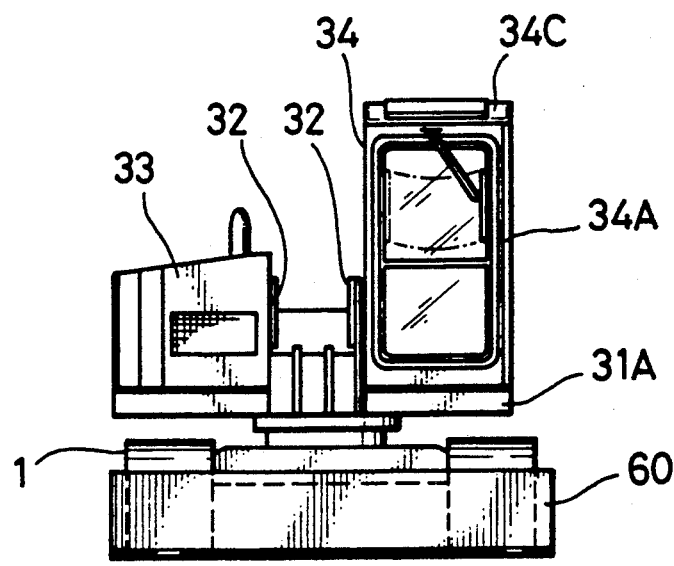
Figure 10:
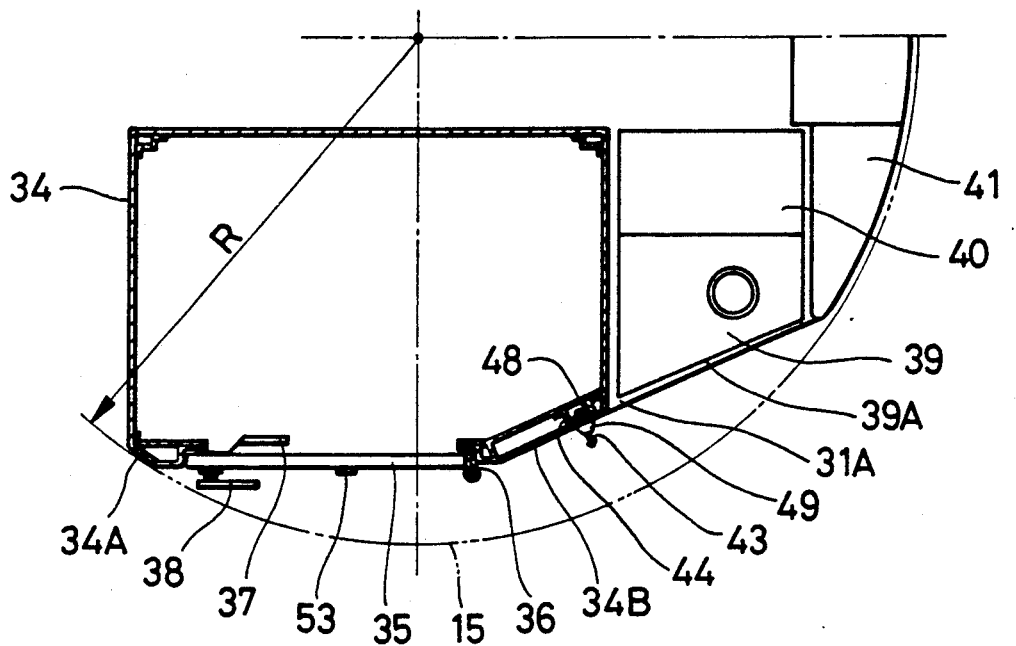

In these figures, the reference numeral 31 denotes an upper rotary body which is swivellably mounted on the lower travelling body 1. Similarly to the upper rotary body 2 of the prior art machine, the upper rotary body 31 is provided with a frame 31A which constitutes the skeletal structure along with a pair of brackets 32 for the working equipments 16. A machine room 33 is provided on the frame 31A on the right side of the brackets 32 (on the left side in FIG. 9). In FIG. 9, the brackets 32 are shown but the working equipments 16 are omitted.

Figure 7:
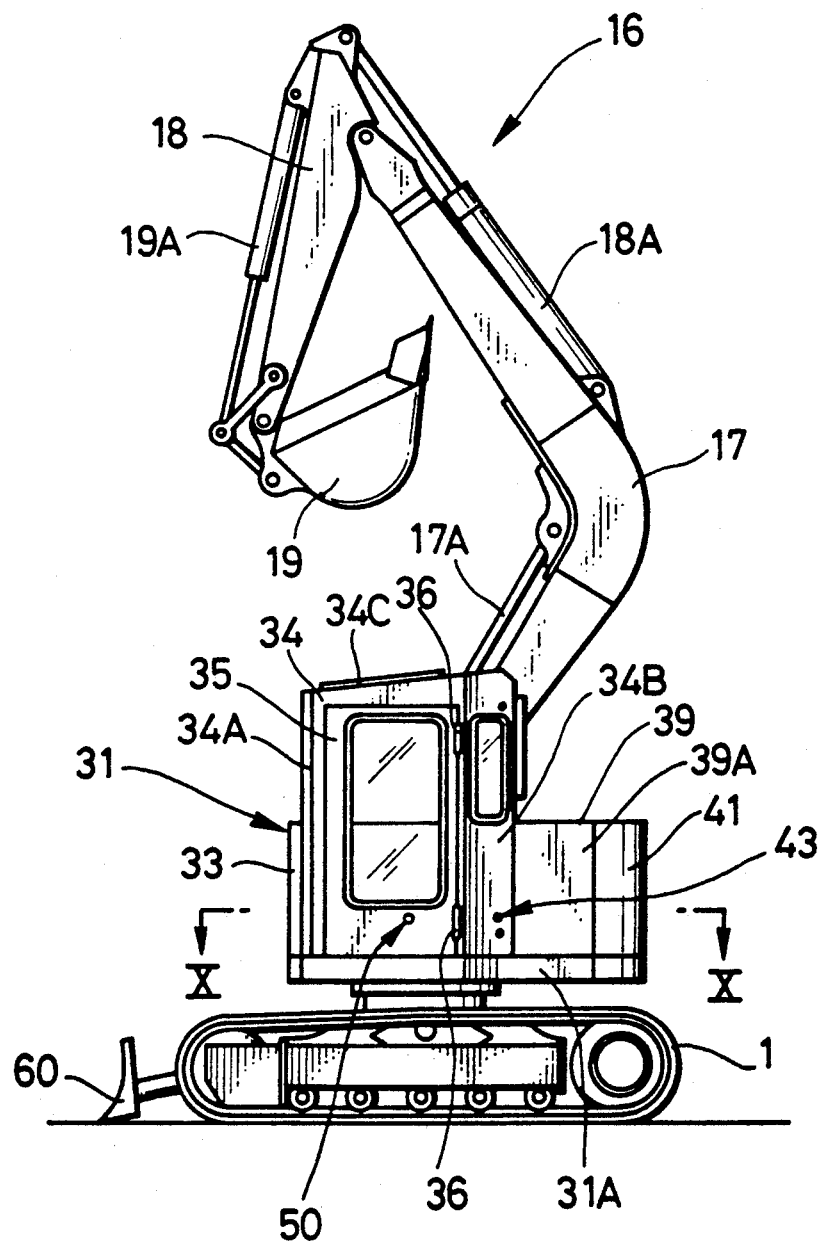

Indicated at 34 is an operator's cabin which is located in a front left portion of the upper rotary body 31. This operator's cabin 34 is formed in a substantially rectangular shape and in a relatively large size to improve the dwellability and maneuverability of the operator. A relatively small chamfered portion 34A is formed in a left front portion of the operator's cabin 34 over the entire height of the cabin to fit same within the circle 15 of the rotational radius R, while a larger chamfered portion 34B is formed in a left rear portion also over the entire height of the cabin 34. In this instance, the chamfered portion 34B of the operator's cabin 34 is formed in a larger width than the chamfered portion 21B of the foregoing first embodiment to permit to open a door 35 largely rearward. The ceiling 34C of the operator's cabin 34 is inclined forwardly downward to prevent the claws at the fore end of the bucket from contacting the operator's cabin 34 when using known side ditch excavating equipments in place of the boom 17, arm 18 and bucket 19 and turning them into the folded position as shown in FIG. 7.

Figure 11:
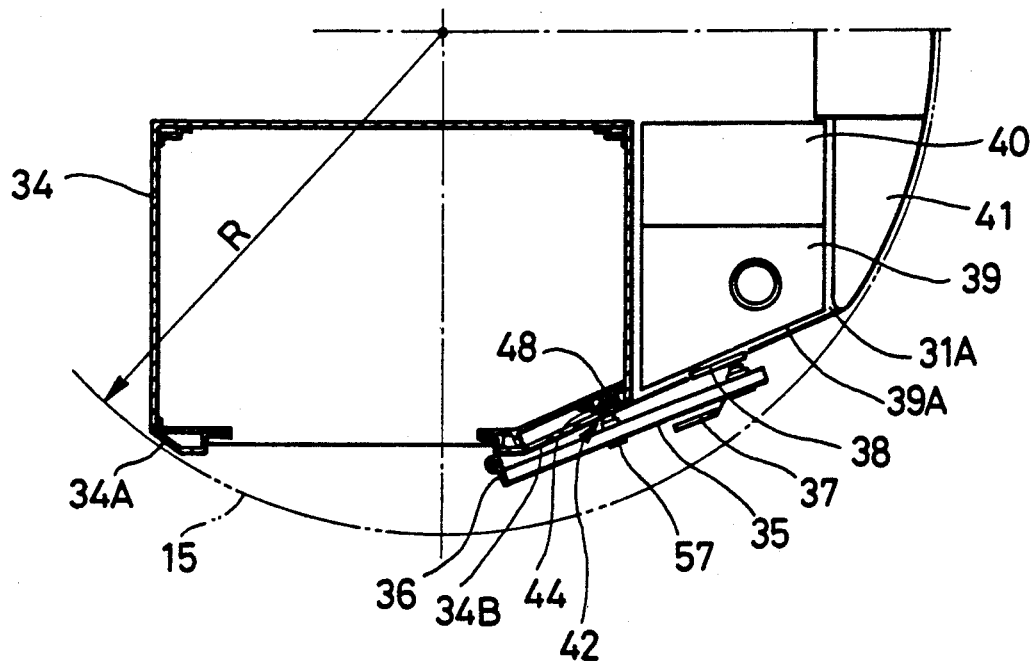

Indicated at 35 is the door which is swingably attached to the left side of the operator's cabin 34 by means of upper and lower hinges 36. As shown particularly in FIG. 11, the door 35 can be opened largely rearward and locked in the fully opened state to the chamfered portion 34B of the operator's cabin 34 by means of a lock device 42 which will be described hereinafter. When in the fully opened state, the door 35 is received within the circle 15 of the rotational radius R as shown in FIG. 11 to prevent its collision against circumferential obstacles. The reference numerals 37 and 38 denote the knobs which are provided on the inner and outer sides of the door 35 and manipulated in the usual manner to open and close the door 35. Indicated at 39 is a fuel tank which is provided on the frame 31A in a position rearward of the operator's cabin 34 and forward of the counterweight 41 which will be described hereinafter. The fuel tank 39 has its left side wall inclined to form a chamfered portion 39A with an angle conforming with the chamfered portion 34B of the operator's cabin 34, thereby ensuring that the door 35 be opened largely rearward. Designated at 40 is an operating oil tank, and at 41 is a counterweight which is positioned on a rear portion of the frame 31A behind the operating oil tank 40, fuel tank 39 and machine room 33, and formed in an arcuate shape extending substantially along the circle 15 of the rotational radius R, right portion 41A of the counterweight 41 covering a rear portion of the machine room 33 from above.

Figure 12:
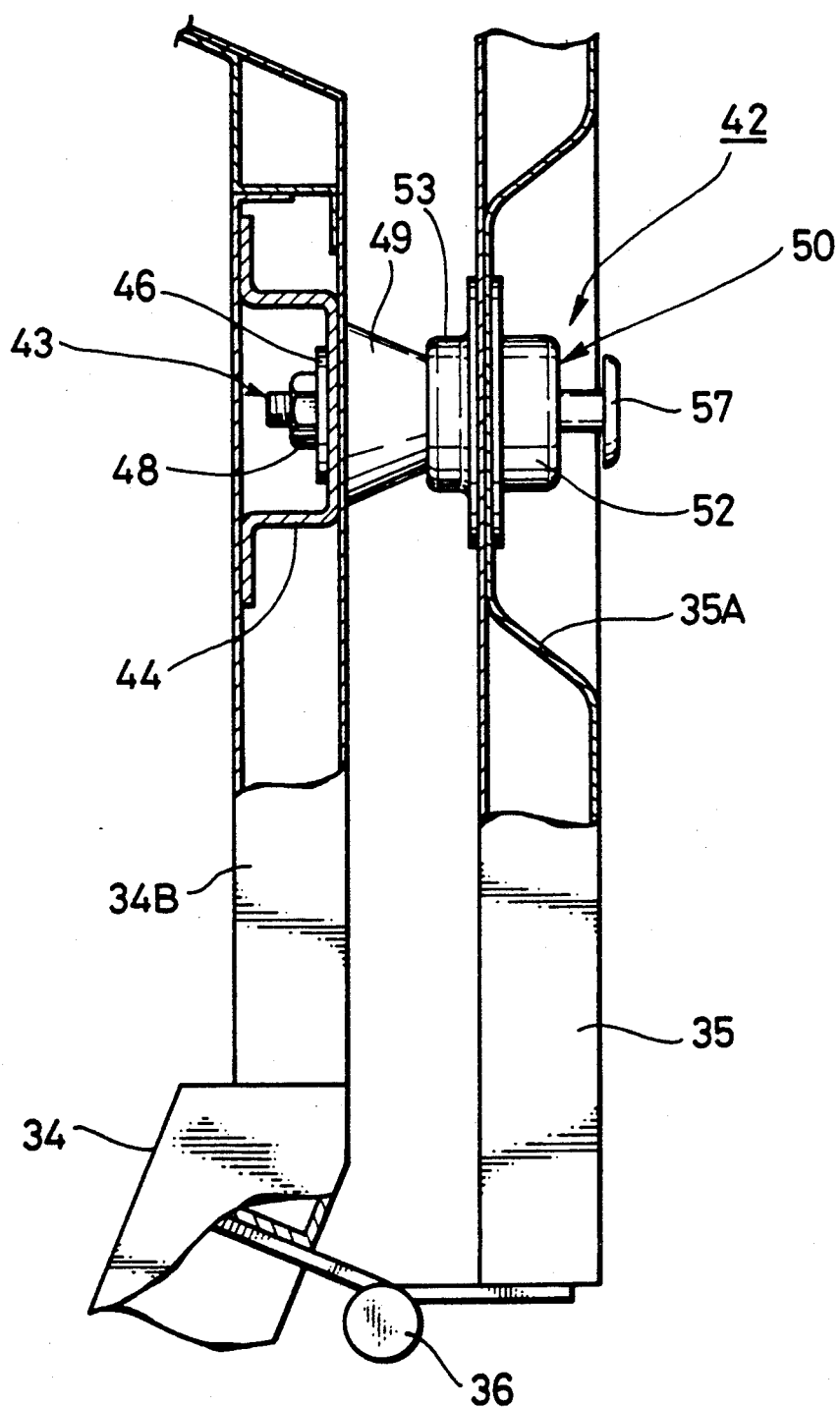
Figure 13:
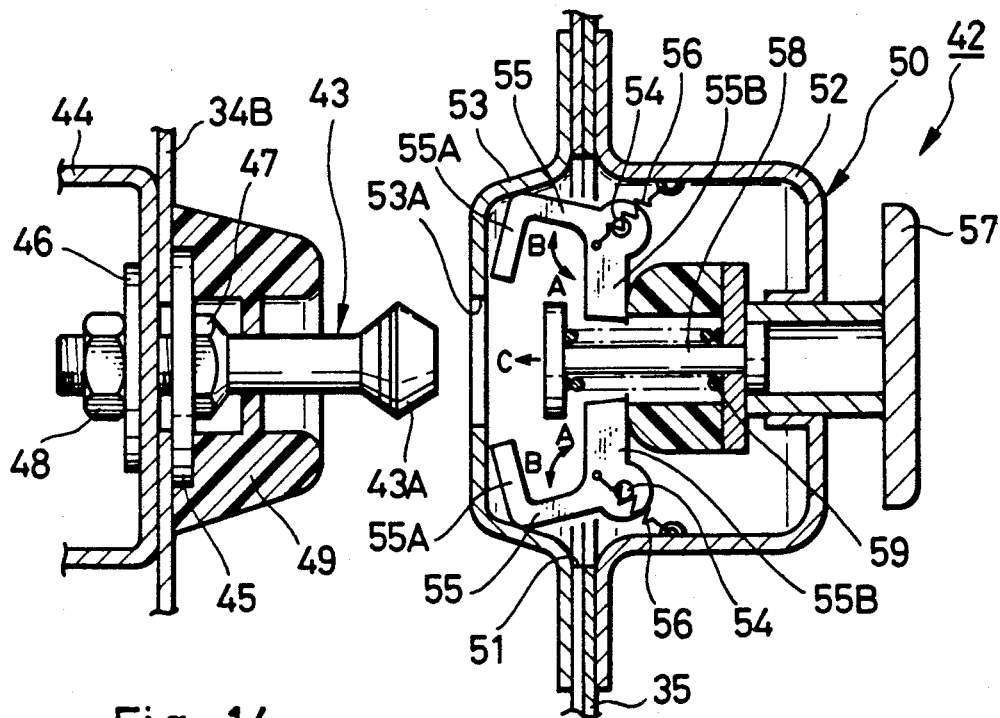
Figure 14:
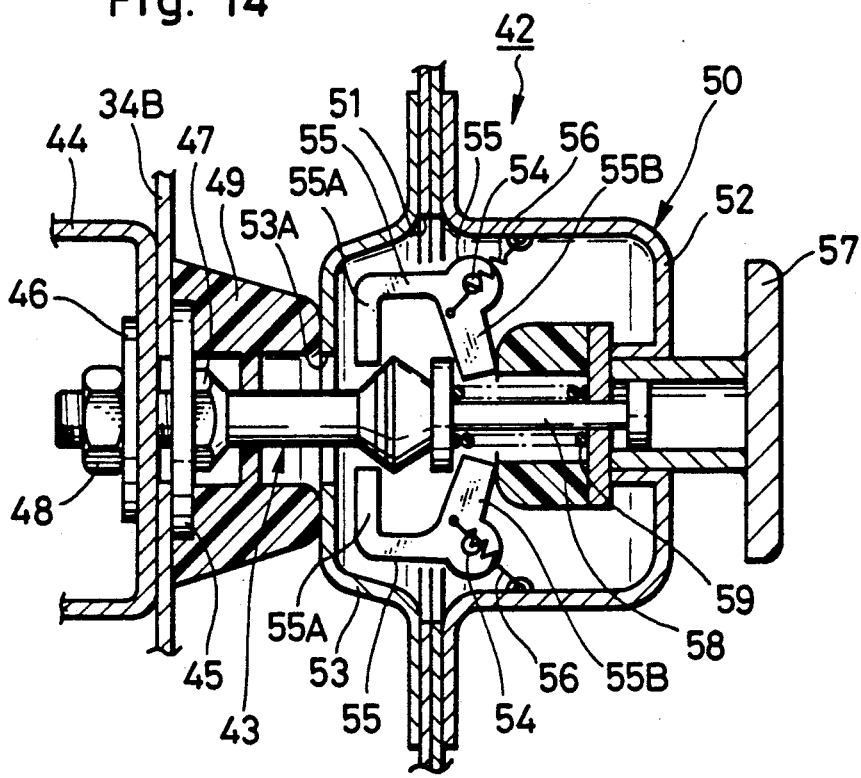

Indicated at 42 is a lock device which is employed in this embodiment, and which is constituted, as shown in FIGS. 12 to 14, by a fixed coupling rod 43 projected from the chamfered portion 34B of the operator's cabin 34 and a lock mechanism 50 fitted in the door 35 as will be described hereinafter. Namely, the fixed coupling rod 43 consists of a rod-like body with a coupling head 43A of a larger diameter at the fore end thereof, the rod 43 being positioned in a lower portion on the outer surface of the chamfered portion 34B of the operator's cabin 34 and inserted in and securely fixed to the chamfered portion 34B and a reinforcing plate 44 which is secured to inner surfaces of the chamfered portion 34B, by means of washers 45, 46 and a pair of nuts 47 and 48. A cylindrical buffer member 49 of a resilient material is securely fixed to the outer surface of the chamfered portion 34B in such a manner as to surround the circumference of the fixed coupling rod 43.

On the other hand, as shown in FIGS. 12 and 13, a lock mechanism 50 is fitted in a clamp member receptacle hole 51 which is formed across the inner and outer surfaces of the door 35. As seen in FIGS. 12-14, this lock mechanism 50 is constituted by: an inner cover 52 securely fixed in an inner recess 35A of the door 35; an outer cover 53 having a rod receiving hole 53A and securely fixed to the outer surface of the door 35; a pair of clamp members 55 of U-shape having a locking portion 55A and an actuating portion 55B and rockably supported in the inner cover 52 by pins 54 and 55 for rocking movements in the directions of arrows A and B; a biasing spring 56 tensioned between each clamp member 55 and the inner cover 52 to selectively bias the locking portion 55A in an approaching direction A or in a parting direction B; a pusher 57 slidably fitted in the inner cover 52 to rock the paired locking members 55A away from each other by pressing the actuating portions 55B of the respective clamp members 55 against the spring forces of the biasing springs 56; an actuator rod 58 slidably fitted in the pusher 57 and abuttingly engageable at one end with the afore-mentioned fixed coupling rod 43; and a buffer spring 59 interposed between the actuator rod 58 and the pusher 57 to bias the actuator rod 58 constantly in the direction of arrow C.

As the lock device 42 is constructed in the above-described manner, the paired clamp members 55 of the lock mechanism 50 hold the locking portion 55A away from each other in the directions of arrows B by the spring forces of the biasing springs 56, 56 as shown in FIG. 13 before the door 35 is opened into the locking position against the chamfered portion 34B of the operator's cabin On the other hand, in order to fully open the door 35 and lock same to the chamfered portion 34B of the operator's cabin 34, it is swung toward the chamfered portion 34B through the hinges 36, 36 until the coupling head 43A of the fixed coupling rod 43 is fitted into the rod receiving hole 53A of the outer cover 53. By so doing, the fixed coupling rod 43 pushes the actuator rod 58 rightward in FIG. 14 against the spring force of the buffer spring 59, pushing the actuating portions 55B of each clamp members 55 by the sliding displacement of the actuator rod 58. As a result, the clamp members 55 are turned in the directions of arrows A against the actions of the biasing springs 56, 56, and the locking portions 55A, 55A are embracingly engaged with the coupling head 43A of the fixed coupling rod 43 to lock the door 35 unswingably in the fully opened position.

In order to release the door 35 from the locked state, one pushes the pusher 57 leftward in FIG. 14 to turn the clamp members 55, 55 in the directions of arrows B against the actions of the biasing springs 56, 56 to assume the positions of FIG. 13.

Figure 8:
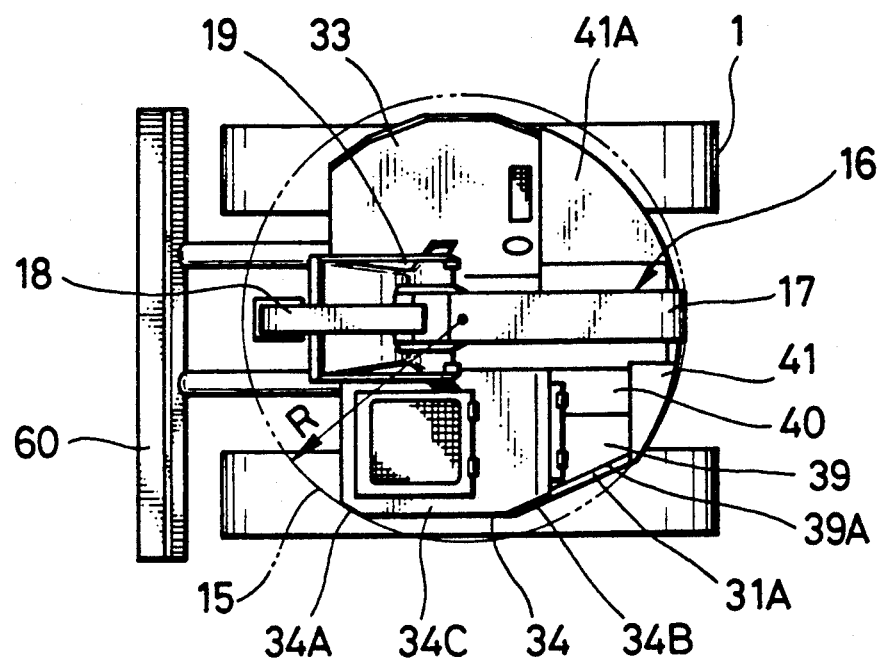

The reference numeral 60 indicates a scraper which is provided in a front portion of the lower travelling body 1 (see FIGS. 7 to 9).

In addition to the operational effects similar to those of the first embodiment, the embodiment with the above-described construction is especially advantageous in that transmission of vibration to the door 35 from the machine parts other than the operator's cabin 34 is suitably prevented by the lock device 42 which is provided between the chamfered portion 34B of the operator's cabin 34 and the door 35 for releasably locking the fully opened door 35 to the chamfered portion 34B. That is to say, arrangements may be made to lock the fully opened door 35 to a machine part other than the operator's cabin 34 for example, to the fuel tank 39 or the like. In such a case, however, in consideration of the probability of the door 35 being put in sympathy by the vibrations from the operator's cabin 34 and the fuel tank 39 or the like and thereby imposed with an additional load, it becomes necessary to provide a resonance preventing means, resulting in an increased cost.

Therefore, in this embodiment, the door 35 is locked to the chamfered portion 34B of the operator's cabin 34 to solve the above-mentioned problem of sympathy and to improve the durability of the door 35.

Although the lock device 42 has been described as being constituted by a pair of clamp members 55, a pusher 57 and so forth in the foregoing second embodiment, it is to be understood that the lock device 42 is not restricted to the particular construction shown and may employ other constructions which lock the fully opened door 35 to the operator's cabin 34.

Further, the chamfered portion 21B (34B) is provided in a left rear portion of the operator's cabin 21 (34) in the foregoing embodiments, it is also possible to indent a left rear portion of the operator's cabin 21 (34) to fit the door 22 (35) swingably in a front section of the indented portion in such a manner that it can be opened largely toward the left side surface of the fuel tank 23 (39).

Furthermore, although the chamfered portion 23A (39A) is provided on the fuel tank 23 (39) which is mounted rearward of the operator's cabin 21 (34) and forward of the counterweight 13 (41) in the foregoing embodiments, of course a chamfered portion may be formed on the left side wall of the machine room in a case where the machine room is provided between the operator's cabin 21 (34) and the counterweight 13 (41).

Moreover, the lock device 42 which is adapted to lock the door 35 to the chamfered portion 34A of the operator's cabin 34 in the above-described embodiment, but it is not restricted to the chamfered portion 34A and may be arranged to engage other part of the operator's cabin 34.

Though the present invention is described by way of a hydraulic excavator in the foregoing embodiments, it is not restricted to hydraulic excavators and can be similarly applied to other full-turn type working machines such as hydraulic cranes, side ditch excavators and the like.

The present invention has an advantage that the upper rotary body can be turned in a narrow working site without collisions against circumferential structures or obstacles even when the operator's cabin door is open.

Another advantage of the invention resides in that the upper rotary body can be fully turned with the door open simply after confirming that the left front corner of the operator's cabin would not interfere with a circumferential structure or obstacle. This precludes not only damages of the operator's cabin (including its door) but also injury of the operator, while lessening the efforts of the operator in paying attention to the working environment.

A further advantage of the invention is found in that, since the door is lockable in the open position, the operator may leave the door open while continuing the machine operation, for example, of a hot summer day to secure an airy comfortable working environment.

Still another advantage of the invention is that the transmission of vibration to the door from machine parts other than the operator's cabin can be prevented by locking the door in an open state to the chamfered portion, thus preventing imposition of an additional load on the door.

Although the present invention has been described and shown by way of preferred embodiments, it is to be understood that various alterations and modifications can be made thereto without departing from the basic technical concept of the invention.

We claim:

1. A full-turn type working machine including a lower travelling body, and an upper rotary body swivellably mounted on said lower travelling body for rotation about a vertical axis and having a machine room, an operator's cabin, a fuel tank and a counterweight located within a circle of a predetermined rotational radium R defined by an outermost portion of said upper rotary body spaced from said vertical axis, wherein said working machine comprises:
   a door fitted in an opening of an exterior facing wall of said operator's cabin, said exterior facing wall having forward and rearward vertical edges, said forward edge intersecting said circle of predetermined rotational radium R;
   means for swingably mounting said door to said rearward edge for pivotal movement between a closed position substantially parallel with said exterior facing wall and a fully opened position through an angle greater than 180 degrees; and
   a chamfered wall portion extending between said rearward edge of said exterior facing wall and an edge of a rearwardly facing wall of said operator's cabin, said chamfered wall portion being located a sufficient distance inwardly of said circle of predetermined rotational radius R so as to permit said door to lie against said chamfered wall portion and remain within said circle of predetermined rotational radius R while in said fully opened position.

2. The full-turn type working machine as set forth in claim 1, wherein said chamfered wall portion extending between said rearward edge of said exterior facing wall and said edge of said rearwardly facing wall of said operator's cabin is located in a position rearward of a pivot of said door.

3. The full-turn type working machine set forth in claim 1, wherein said fuel tank is located in a position rearward of said operator's cabin and forward of said counterweight and provided with a chamfered portion to permit said door to be received within said circle of the rotational radius R when opened rearward toward said counterweight.

4. The full-turn type working machine set forth in claim 3, wherein said chamfered portion of the fuel tank is formed with an angle conforming with the chamfered portion of the operator's cabin.

5. The full-turn type working machine set forth in claim 1, wherein said machine room is located in a position rearward of said operator's cabin and forward of said counterweight and provided with a chamfered portion to permit said door to be received within said circle of the rotational radius R when opened rearward toward said counterweight.

6. The, full-turn type working machine set forth in claims 1, 3 or 5, further comprising a lock device for locking said door in an opened position within said circle of the rotational radius R.

7. The full-turn type working machine set forth in claim 6, wherein said lock device is provided between said door and said operator's cabin.

8. The full-turn type working machine set forth in claim 7, wherein said lock device is provided between said door and said chamfered portion of said operator's cabin.

* * * * *

UNITED STATES PATENT AND TRADEMARK OFFICE
CERTIFICATE OF CORRECTION

PATENT NO. : 5,016,721

DATED : May 21, 1991

INVENTOR(S) : Nobuyoshi Yamamoto et al.

It is certified that error appears in the above-identified patent and that said Letters Patent is hereby corrected as shown below:

Title page, item (63):

The Foreign Application Data has been omitted, should be,

--Oct. 9, 1987 [JP] Japan ..................62-155396

--Aug. 31, 1988 [JP] Japan ..................63-217538--.

Signed and Sealed this

Fifteenth Day of December, 1992

*Attest:*

DOUGLAS B. COMER

*Attesting Officer*  *Acting Commissioner of Patents and Trademarks*